United States Patent
Hyatt et al.

(10) Patent No.: US 10,837,859 B2
(45) Date of Patent: Nov. 17, 2020

(54) DRA LEAK DETECTION AND RECOVERY SYSTEM

(71) Applicant: Pipe Line Unique Services LLC, Humble, TX (US)

(72) Inventors: Robert Rinehart Hyatt, Humble, TX (US); George William Hyatt, Wellington, OH (US)

(73) Assignee: PIPE LINE UNIQUE SERVICES LLC, Humble, TX (US)

( * ) Notice: Subject to any disclaimer, the term of this patent is extended or adjusted under 35 U.S.C. 154(b) by 179 days.

(21) Appl. No.: 15/995,186

(22) Filed: Jun. 1, 2018

(65) Prior Publication Data

US 2018/0348083 A1  Dec. 6, 2018

Related U.S. Application Data

(60) Provisional application No. 62/513,521, filed on Jun. 1, 2017.

(51) Int. Cl.
*G01M 3/32* (2006.01)
*F17D 5/02* (2006.01)
*F17D 1/17* (2006.01)
*G01M 3/18* (2006.01)
*G01M 3/28* (2006.01)

(52) U.S. Cl.
CPC ............. *G01M 3/3245* (2013.01); *F17D 1/17* (2013.01); *F17D 5/02* (2013.01); *G01M 3/186* (2013.01); *G01M 3/3281* (2013.01); *G01M 3/2807* (2013.01)

(58) Field of Classification Search
CPC ............ F17D 1/17; F17D 5/02; G01M 3/186; G01M 3/2807; G01M 3/3245; G01M 3/3281
See application file for complete search history.

(56) References Cited

U.S. PATENT DOCUMENTS

| | | | | |
|---|---|---|---|---|
| 4,653,958 A | * | 3/1987 | Anderson | F17D 5/02 138/104 |
| 4,813,285 A | * | 3/1989 | Brown | G01F 23/241 73/49.2 |
| 5,201,435 A | * | 4/1993 | Harding | B65D 90/24 220/567.2 |
| 5,929,325 A | * | 7/1999 | Cartwright | B65D 90/24 73/49.2 |
| 5,975,332 A | * | 11/1999 | Bishop | E01B 19/006 137/312 |
| 2005/0188750 A1 | * | 9/2005 | Goad | G01M 3/186 73/40 |
| 2006/0021423 A1 | * | 2/2006 | Zhou | G01M 3/186 73/49.2 |
| 2011/0284094 A1 | * | 11/2011 | Chilcoat | F17D 1/14 137/15.01 |

* cited by examiner

*Primary Examiner* — Francis C Gray
(74) *Attorney, Agent, or Firm* — Head, Johnson, Kachigian & Wilkinson, PC

(57) ABSTRACT

A leak detection and recovery system for use with DRA equipment. The system is intended to reduce the risk of a chemical release into the environment, namely the soil, ground water, and waterways. The system may provide clean collection of leaked DRA, early detection of DRA leaks, immediate notification of DRA leaks, and re-use of leaked DRA through clean recovery with no hazardous waste disposal.

10 Claims, 3 Drawing Sheets

US 10,837,859 B2

DRA LEAK DETECTION AND RECOVERY SYSTEM

CROSS REFERENCE

This application is based on and claims priority to U.S. Provisional Patent Application Ser. No. 62/513,521 filed Jun. 1, 2017.

BACKGROUND OF THE INVENTION

Field of the Invention

This invention relates generally to a leak detection and recovery system, and more particularly, but not by way of limitation, to a system for use with drag reducer injection equipment that prevents loss and contamination of leaking DRA, as well as providing for detection of the leak and recovery of the leaked DRA.

Description of the Related Art

Drag reducing agent (DRA) is often injected into pipelines to reduce drag and associated turbulence within the pipeline. DRA is dangerous, however, if released into the environment, namely the soil, ground water, and waterways, such as through DRA storage or injection equipment leaks. Furthermore, DRA that leaks from storage or injection equipment is subject to contamination, and thus cannot be reused and must be disposed of through incineration or remediation. This can be expensive, both in terms of the loss of the DRA chemicals themselves, which must then be replaced, and the actual expense of disposal.

Based on the foregoing, it is desirable to provide a system of DRA leak detection and recovery.

It is further desirable for such system to provide clean collection of leaked DRA, eliminating the opportunity for contamination and allowing the DRA to be reused.

It is further desirable for such system to provide leak detection to alert an operator to the presence of a leak and allow the leak to be repaired quickly.

It is further desirable for such system to allow immediate reuse of the leaked DRA, eliminating the need for hazardous waste disposal.

It is further desirable for such system to prevent environmental damage due to DRA leaks.

SUMMARY OF THE INVENTION

In general, in a first aspect, the invention relates to a system comprising an upper section comprising injection equipment and a lower section comprising a catch basin. The catch basin may be positioned such that leaks from the injection equipment of the upper section are collected in the catch basin. The catch basin may be located entirely within the lower section, while the upper section may be located above the lower section. Thus, the upper section may fully cover the lower section such that the upper section protects the catch basin from contamination from ambient elements.

The catch basin may have a floor that slopes to a single low point. The lower section may further comprise a drain located at the low point of the catch basin. The drain may be in fluid communication with the exterior of the lower section via a valve.

The system may further comprise a level detection instrument, which may be located at the low point of the catch basin. The level detection instrument may be in communication with a PLC capable of shutting down the injection equipment located within the upper section.

The injection equipment may be DRA injection equipment. The lower section may be generally rectangular with closed sides and an open top, while the upper section may be generally rectangular with closed sides and a partially open bottom. The bottom of the upper section may have the same dimensions as the top of the lower section and the upper section may sit atop the lower section such that the lower section is protected from contamination from ambient elements.

In a second aspect, the invention relates to a method of detecting and recovering DRA leaks, the method comprising: injecting DRA into a pipeline via injection equipment located in an upper section, where the upper section is located above a lower section; and catching leaks from the injection equipment in a catch basin located in the lower section, where the catch basin is protected from contamination from ambient elements.

The method may further comprise detecting leaks from the injection equipment. Specifically, leaks may be detected by a level detection instrument located at a low point in the catch basin, where the catch basin slopes downward at all points to the low point such that all leaked DRA from the injection equipment travels to the low point. The method may further comprise shutting down the injection equipment when the level detection instrument detects a leak. Shutting down the injection equipment may comprise transmitting a signal from the level detection instrument to a PLC when the level detection instrument detects a level and shutting down the injection equipment when the PLC receives the signal indicating that the level detection instrument detects the level. The method may further comprise notifying a person or relaying a signal to a remote PLC when the level detection instrument detects a leak.

The method may further comprise collecting leaked DRA from the catch basin via a drain located at a low point in the catch basin, where the catch basin slopes downward at all points to the low point such that all leaked DRA from the injection equipment travels to the low point. Collecting leaked DRA from the catch basin via the drain may comprise opening a valve in fluid communication with the drain. The method may further comprise re-using the leaked DRA.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a leak detection and recovery system for use with DRA equipment. The system is intended to reduce the risk of a chemical release into the environment, namely the soil, ground water, and waterways. It may further reduce the need and risk of disposing of a chemical release through incineration or remediation. These benefits may arise from the system when used as part of a DRA injection skid.

As described below, the system may provide clean collection of leaked DRA, early detection of DRA leaks, immediate notification of DRA leaks, and re-use of leaked DRA through clean recovery with no hazardous waste disposal.

Figure 1:
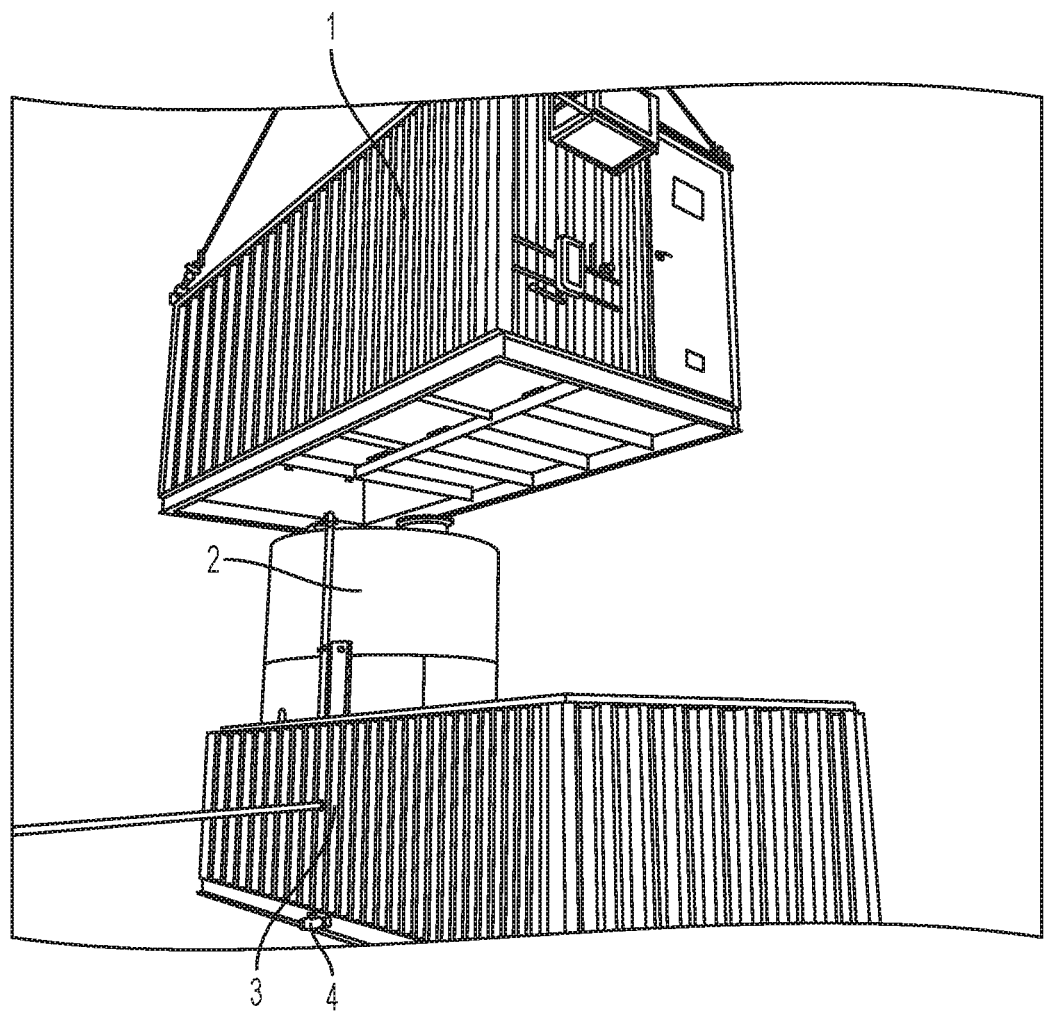
FIG. 1 is a perspective view of the system of the present invention during assembly.
Figure 2:
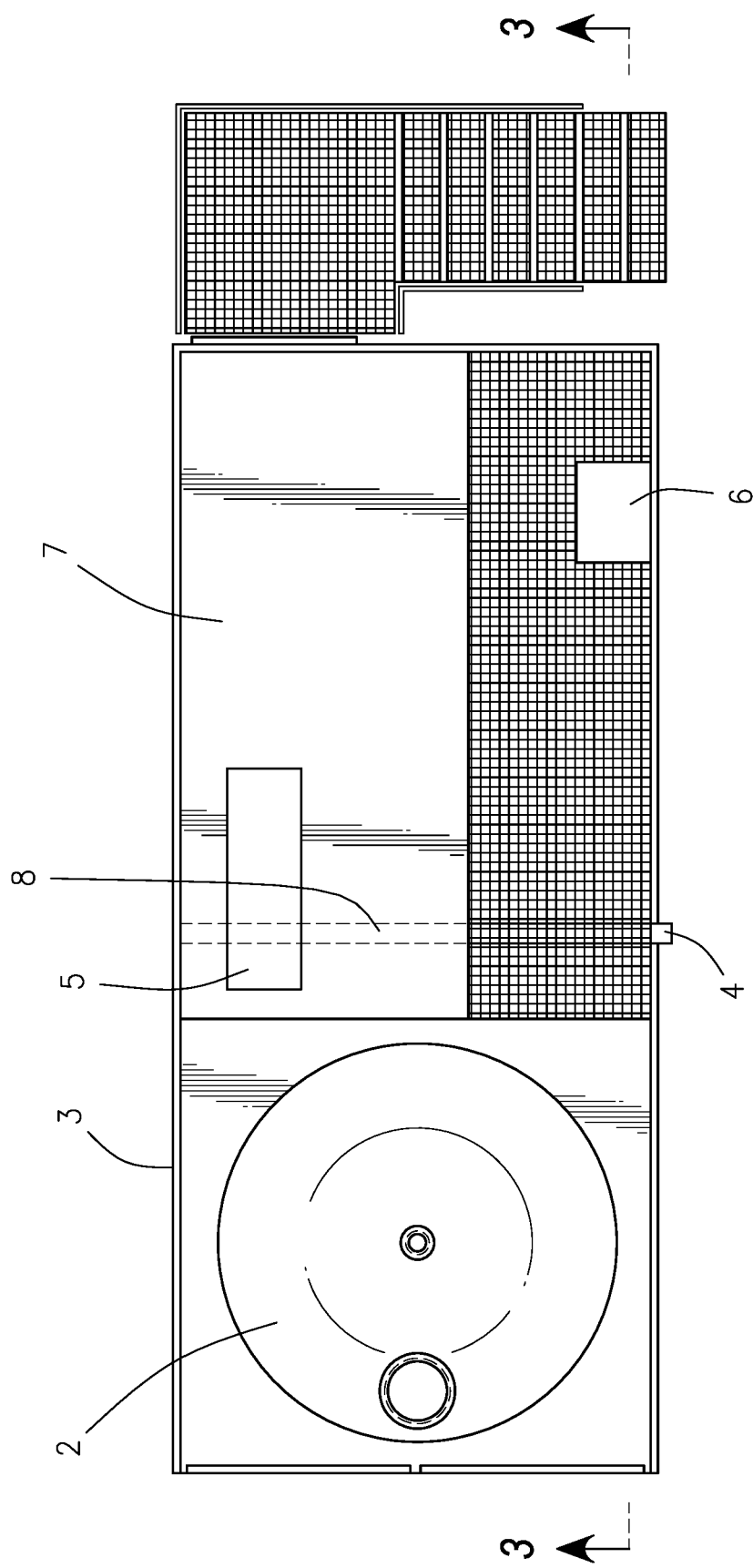
FIG. 2 is a top diagrammatic view of the system.
Figure 3:
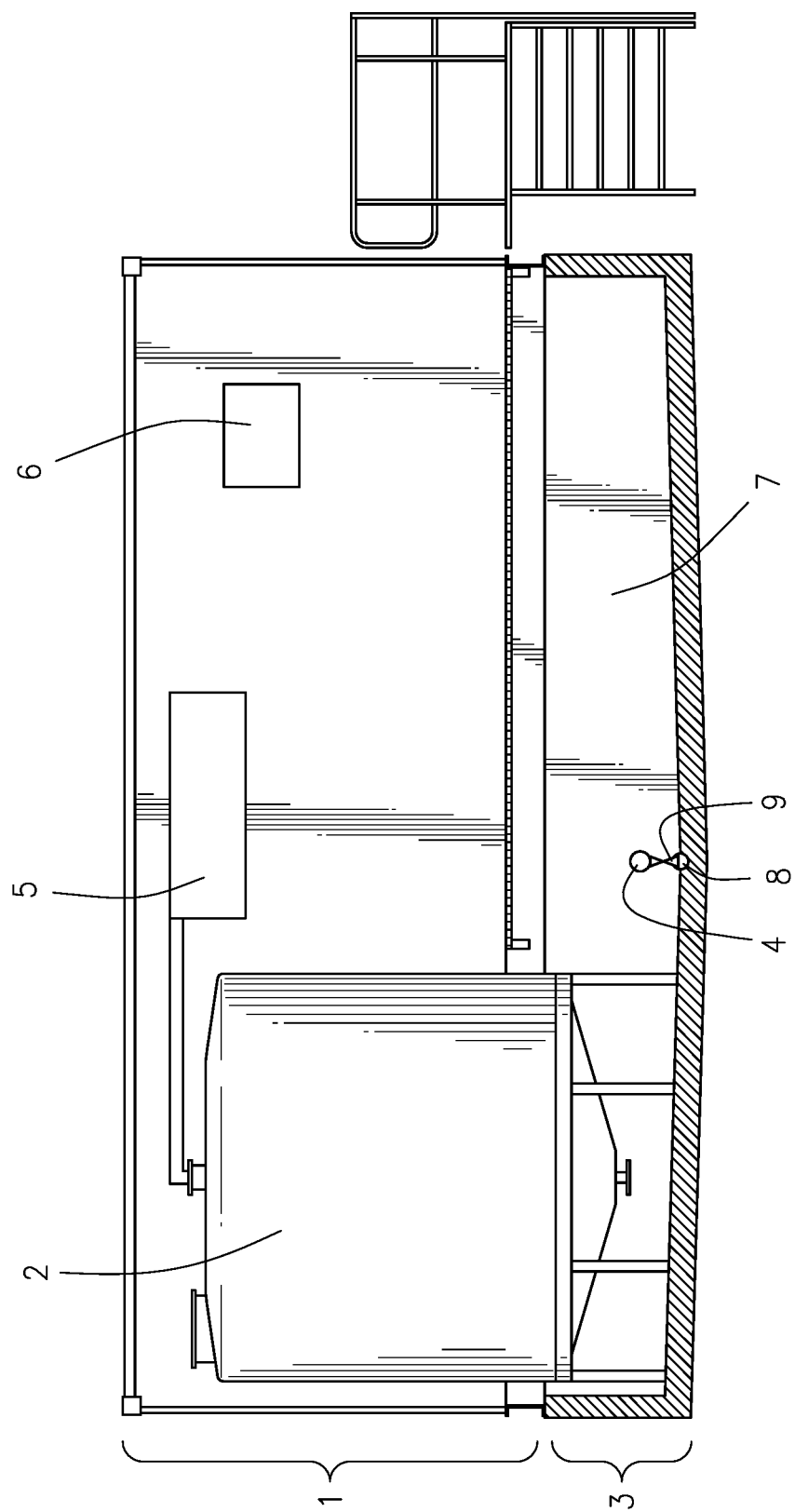
FIG. 3 is a side diagrammatic view of the system.
Other advantages and features will be apparent from the following description and from the claims.

The system may comprise an upper section 1, a tank 2, and a lower section 3, as shown in FIG. 1. The upper section 1 may house DRA injection equipment 5, while the tank 2 may be a storage tank. The upper section 1 may sit atop the lower section 3. Little or substantially no part of the upper section 1 may extend laterally beyond the lower section 3, such that all or substantially all of the DRA injection equipment 5 may be located above the lower section 3. The tank 2 may sit within the lower section 3 and extend upward into the upper section 1 or may sit wholly within the upper section 1, and thus may be fully enclosed within the upper section 1 and lower section 3.

The lower section 3 may comprise a catch basin 7. The catch basin 7 may be fully enclosed. The lower section 3 may be fully covered by the upper section 1. Thus, the catch basin 7 may be isolated from any ambient elements, such as rain, snow, dirt, wind, and sunlight. The catch basin 7 may be situated such that it may catch any leaks from the DRA injection equipment 5 in the upper section 1, such as flanges, fittings, hoses, etc. Isolating the catch basin 7 from ambient elements may eliminate cross contamination by these elements, thus keeping the DRA from being classified as hazardous waste. Furthermore, the catch basin 7 may be designed and constructed to hold the entire volume of the tank 2 as a measure of insurance against release.

The catch basin 7 may be sloped to a specific point, such as the middle of the basin 7. A drain 8 may be located at the lowest spot, and the drain 8 may be sloped to one side. Thus, DRA leaking from any location within the upper assembly 1 may flow to a single low point in the basin 7. A level detection instrument 4 may be located at this lowest point or in the drain 8. The level detection instrument 4 may be capable of detecting any level of liquid. The level detection instrument 4 may generate a signal that may be transmitted to an onboard PLC 6 and tied into the PLC's logic so as to shut down all functions of the skid upon detecting a level. Locating the instrument 4 at the lowest section of the basin 7 may allow for early detection, thus minimizing the leak.

In addition to shutting down the skid upon detection of a leak, the PLC 6 may additionally notify people or a remote PLC 6 that the leak detection instrument 4 has been tripped or a leak has been detected. Thus, the system may provide for immediate notification of a DRA leak.

Once a leak is detected, the skid is shut down, and the relevant people are notified, the DRA may be recovered. The catch basin 7 may have a valve 9 located at the center drain 8, allowing the leaked, yet still contained and uncontaminated, DRA to be collected and reused.

Once the leak has been repaired and the leaked DRA has been collected, normal operations may resume with no environmental damage, no loss of DRA, and no expensive hazardous waste disposal.

Whereas, the devices and methods have been described in relation to the drawings and claims, it should be understood that other and further modifications, apart from those shown or suggested herein, may be made within the spirit and scope of this invention.

What is claimed is:

1. A system comprising:
    an upper section;
    a lower section comprising a catch basin, where the upper section sits atop the lower section, where the catch basin has a floor that slopes to a single low point, and where the catch basin is capable of holding a volume of liquid;
    a tank located in the upper section or partly in the upper section and partly in the lower section, where the tank has a volume less than the volume of liquid the catch basin is capable of holding;
    DRA injection equipment located in the upper section;
    a level detection instrument located at the low point of the catch basin; and
    a PLC capable of shutting down the injection equipment located within the upper section, where the level detection instrument is in communication with the PLC;
    where the catch basin is positioned such that leaks from the injection equipment in the upper section are collected in the catch basin.

2. The system of claim 1 where:
    the catch basin is located entirely within the lower section;
    the upper section is located above the lower section; and
    the upper section fully covers the lower section, such that the upper section protects the catch basin from contamination from ambient elements.

3. The system of claim 1 where the lower section further comprises a drain located at the low point of the catch basin.

4. The system of claim 3 where the drain is in fluid communication with the exterior of the lower section via a valve.

5. The system of claim 1 where:
    the lower section is generally rectangular with closed sides and an open top;
    the upper section is generally rectangular with closed sides and a partially open bottom, where the bottom of the upper section has the same dimensions as the top of the lower section; and
    the upper section sits atop the lower section and such that the lower section is protected from contamination from ambient elements.

6. A method of detecting and recovering DRA leaks, the method comprising:
    injecting DRA from a tank with a volume via DRA injection equipment located in an upper section, where the upper section is located above a lower section; and
    catching leaks from the DRA injection equipment in a catch basin located in the lower section, where the catch basin is protected from contamination from ambient elements and is capable of holding a volume greater than the volume of the tank;
    detecting leaks from the DRA injection equipment via a level detection instrument located at a low point in the catch basin, where the catch basin slopes downward at all points to the low point such that all leaked DRA from the DRA injection equipment travels to the low point;
    transmitting a signal from the level detection instrument to a PLC when the level detection instrument detects a level; and shutting down the DRA injection equipment when the PLC receives the signal indicating that the level detection instrument detects the level.

7. The method of claim 6 further comprising notifying a person or remove PLC when the level detection instrument detects a leak.

8. The method of claim 6 further comprising collecting leaked DRA from the catch basin via a drain located at the low point in the catch basin.

9. The method of claim 7 where collecting leaked DRA from the catch basin via the drain comprises opening a valve in fluid communication with the drain.

10. The method of claim 7 further comprising re-using the leaked DRA.

* * * * *